United States Patent
Quan et al.

(10) Patent No.: US 6,473,369 B1
(45) Date of Patent: Oct. 29, 2002

(54) METHODS AND APPARATUS FOR REGENERATING TRACK CROSSING SIGNALS FOR SEARCHES ACROSS UNRECORDED AREAS ON READ/WRITE OPTICAL DISCS

(75) Inventors: Thomas Quan, Mountain View; Trang Le, Sunnyvale, both of CA (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/471,432

(22) Filed: Dec. 23, 1999

(51) Int. Cl.[7] ................................................ G11B 7/00
(52) U.S. Cl. ............................... 369/30.14; 369/44.28; 369/53.32
(58) Field of Search ........................... 369/44.28, 30.1, 369/44.29, 59.13, 59.17, 59.18, 59.19, 53.35, 53.32, 30.13, 30.14, 124.15; 360/77.02, 77.07, 78.04, 78.05, 51, 52

(56) References Cited

U.S. PATENT DOCUMENTS 5,172,353 A * 12/1992 Ito ........................... 369/44.28
5,239,530 A * 8/1993 Seo et al. ................. 369/30.13
5,457,671 A * 10/1995 Takata et al. ............ 369/44.28

FOREIGN PATENT DOCUMENTS

| JP | 402058736 A | * 2/1990 |
| JP | 402137129 A | * 5/1990 |
| JP | 406036300 A | * 2/1994 |

* cited by examiner

Primary Examiner—Thang V. Tran
(74) Attorney, Agent, or Firm—John F. Schipper; Richard E. Bee

(57) ABSTRACT

A fast-acting method of regenerating track crossing signals for track searches across unrecorded areas on read/write optical discs is provided. This is accomplished by comparing the in-phase and quadrature-phase track crossing signals generated by the optical pickup head when a track search is being performed. A blank signal is generated when no quadrature-phase signal transition occurs between two successive in-phase signal transitions. Fake quadrature-phase signals are continuously generated. Upon occurrence of a blank indicating signal, the fake quadrature-phase signals are immediately supplied to the track crossing counter mechanism in place of the missing quadrature-phase signals. As a result, there is no loss of track count.

11 Claims, 18 Drawing Sheets

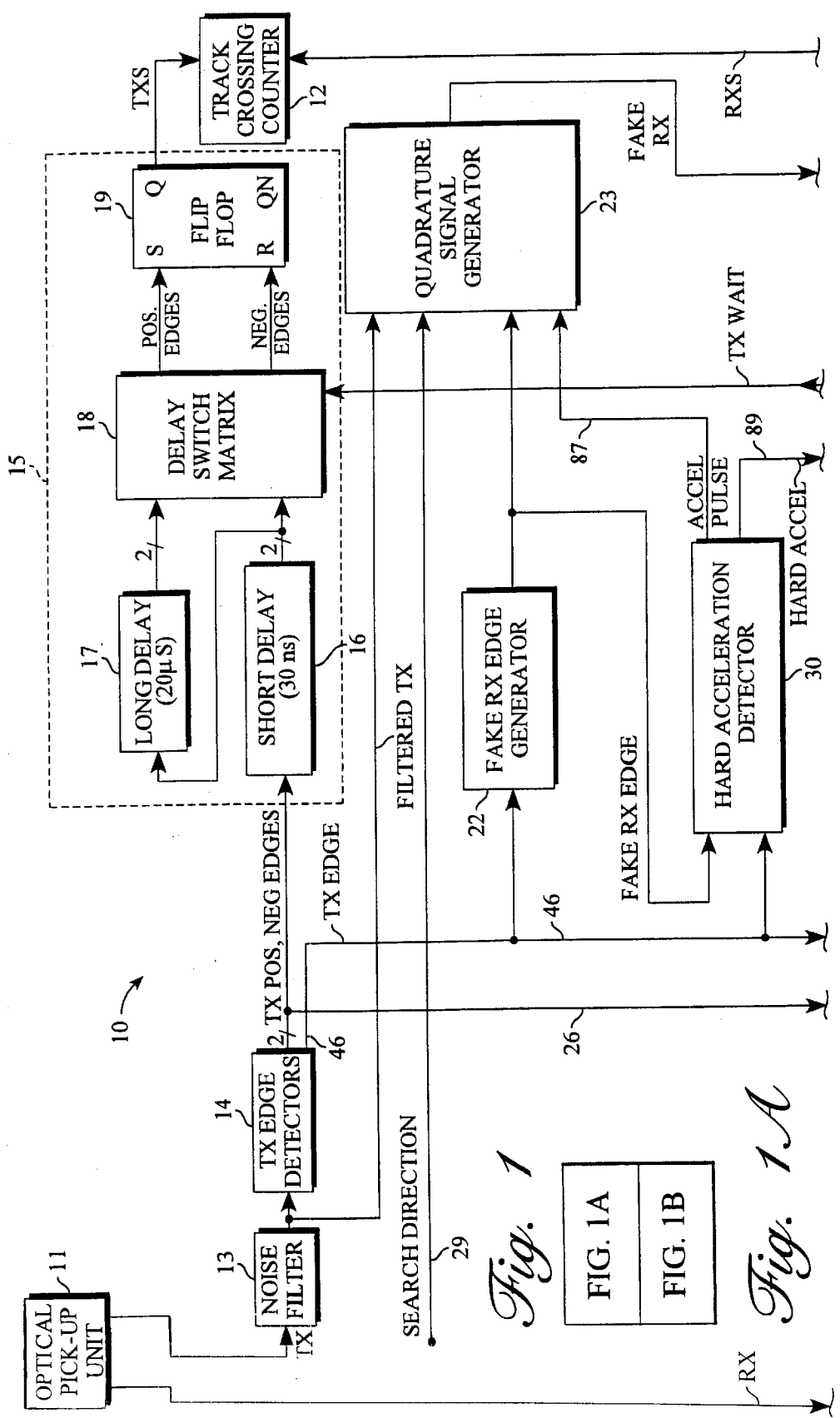

METHODS AND APPARATUS FOR REGENERATING TRACK CROSSING SIGNALS FOR SEARCHES ACROSS UNRECORDED AREAS ON READ/WRITE OPTICAL DISCS

DESCRIPTION

1. Technical Field

This invention relates to methods and apparatus for performing track searches across optical recording discs. It is particularly useful in connection with track searches across read/write type optical discs.

2. Background of the Invention

It is sometimes desired to jump from one track to a different track on an optical recording disc such as a compact disc. This is accomplished by moving the optical pickup head rapidly across the compact disc in a radial direction and counting the disc tracks as they are crossed. When the proper number of tracks have been crossed, the search is terminated and normal operations are resumed. During the rapid radial search movement, the optical pickup head generates a pair of track crossing signals which are used for track counting purposes and for determining the track crossing direction. One of these signals is an in-phase signal and is commonly referred to as a TX signal. The other is a quadrature-phase signal which is commonly referred to as an RX signal. These are pulse type signals of the same frequency which are offset in time relative to one another. More particularly, one signal leads the other by a factor of 90°. The search direction is determined by which signal is leading.

A problem is encountered when performing track searches across read/write type optical discs. The problem arises when trying to count track crossings across blank (unrecorded) areas on the read/write disc. During this time, the quadrature-phase signal or RX signal is lost due to the low contrast of reflected light off the unwritten tracks. In blank (unwritten) areas, the RX signal level becomes very small and unreadable. This loss of the RX signal causes the track count to be lost because the direction information cannot be determined by TX alone.

SUMMARY OF THE INVENTION

This invention detects when the optical pickup head is in a blank or unrecorded area of a read/write disc. An artificially-generated RX signal is derived from the TX signal and is used as a substitute when the track search is in a blank region of the disc. This substitute RX or "fake RX" signal allows the track counting to continue uninterrupted after crossing the blank boundary, making the track jumps "seamless". The key to this invention is the rapid detection of the blank area within one-half of a track crossing and the fast insertion of a substitute signal for the RX signal that is lost as the optical pickup unit crosses the boundary from recorded tracks to blank tracks.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 1 shows the relationship between FIGS. 1A and 1B;

FIGS. 1A and 1B, taken together, show a schematic block diagram of a representative embodiment of apparatus constructed in accordance with the present invention for regenerating track crossing signals for track searches across unrecorded areas on read/write optical discs;

DETAILED DESCRIPTION OF THE ILLUSTRATED EMBODIMENT

Figure 1B:
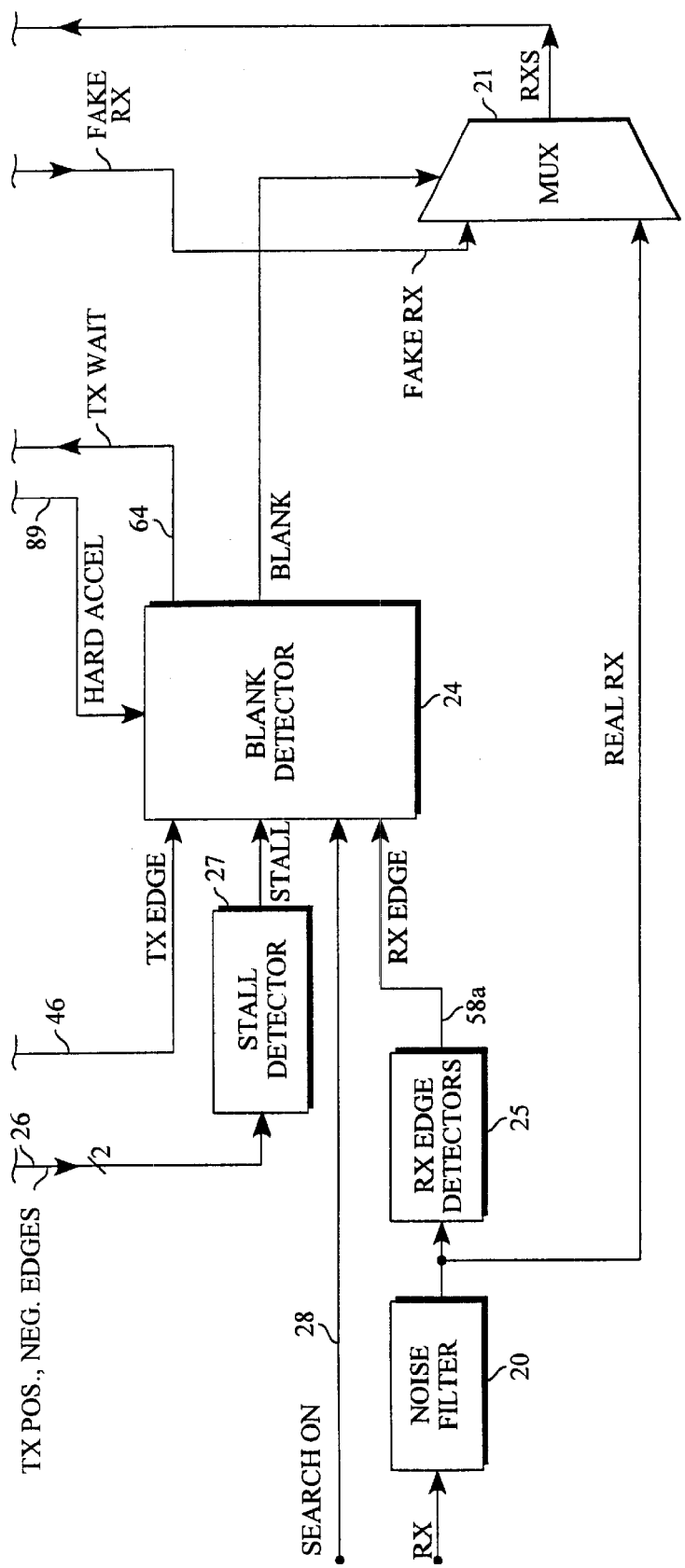

Referring to FIGS. 1A and 1B there is shown apparatus 10 for receiving track crossing signals from an optical pickup unit or pickup head 11 as it moves rapidly across the surface of an optical recording disc, processing such signals and supplying them to a track crossing counter 12 for keeping track of the position of the optical pickup head 11. During normal operation of an optical disc, the pickup head 11 follows the spiral track on the optical disc and supplies the detected information signals (video, audio, digital data, etc.) to a playback unit (not shown) for reproducing the recorded information. The track crossing apparatus 10 is inactive during such normal playback period. When it is desired to jump from the current track to a different track, which may be many tracks away, the playback apparatus switches to a track search mode. In this mode, the optical pickup unit 11 is moved rapidly across the optical disc in a radial direction until the desired number of track crossings is counted. When the desired track is reached, the search mode is discontinued and normal playback or recording operations are resumed.

The apparatus 10 solves a troublesome problem which is encountered with read/write type optical discs when making track searches across such discs. For sake of example, it will be assumed that the disc in question is a read/write type compact disc. During track searches, as the optical pickup unit 11 is moving radially across the compact disc, two track crossing signals, TX and RX, are generated by the optical pickup unit 11. The TX signal will be referred to herein as the in-phase signal and the RX signal will be referred to as the quadrature-phase signal. These signals are pulse signals having the same frequency that are offset in time relative to one another. Through optical alignment and by algebraic combination of separate photo detector elements in the pickup unit 11, these TX and RX signals are in quadrature, that is, 90° out of phase with each other. Either TX can lead RX or RX can lead TX, depending on the direction of movement of the optical pickup unit 11.

When searching across recorded areas on the compact disc, the track crossing apparatus 10 allows the pickup unit generated TX and RX signals to be used with minimal alterations. When searching across blank areas or unrecorded areas on the compact disc, the RX signal is lost because of the low contrast of reflected light off the unwritten tracks. When this happens, the track crossing apparatus 10 provides a substitute RX signal whose phase relationship to TX is based on the desired direction of travel. Apparatus 10 quickly detects the loss of the RX signal and inserts a substitute or fake RX signal in its place. As a result the track crossing counter 12 never misses a count.

Figure 2:
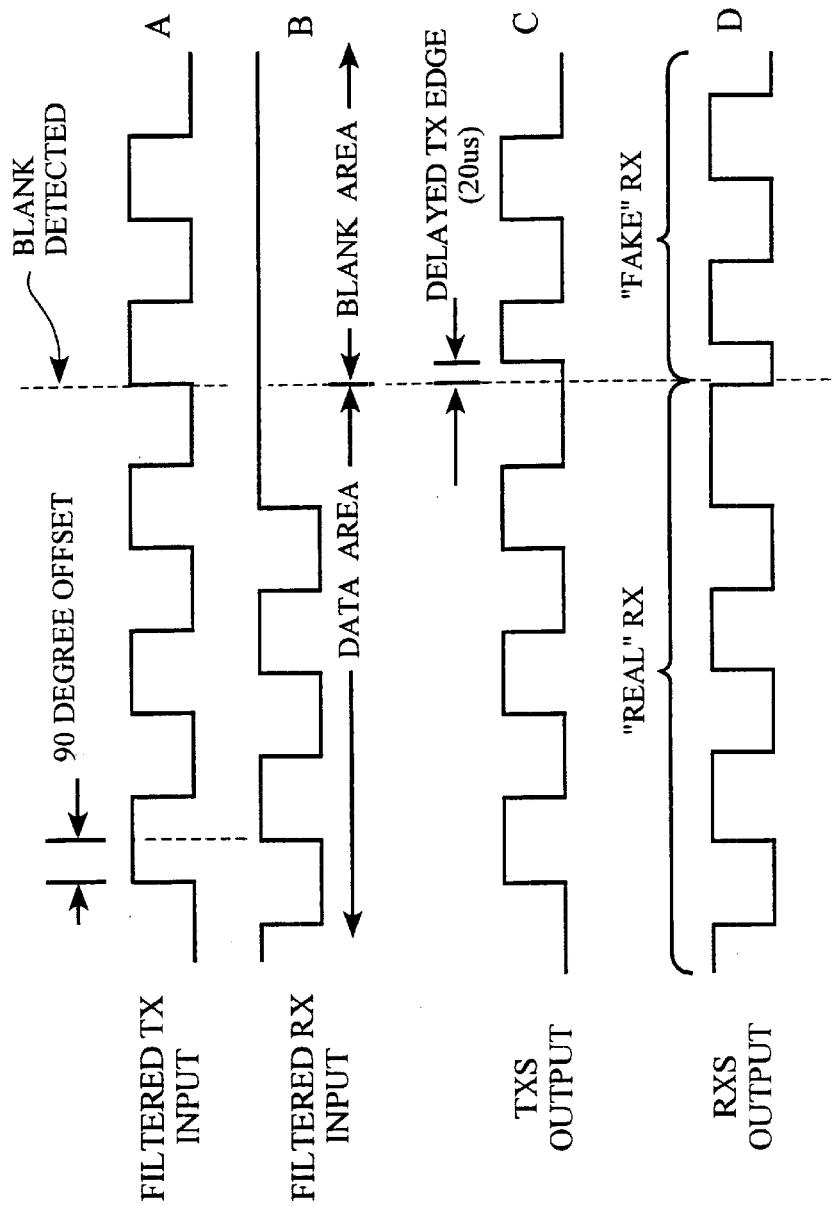
FIG. 2 is a timing diagram used in explaining the operation of the FIG. 1 apparatus.

FIG. 2 shows an example of the track search signals which occur when the optical pickup unit 11 moves from a data area or recorded area on the compact disc to a blank or unrecorded area on the disc. Waveforms A and B show the TX and RX signals, respectively, received from the optical pickup unit 11 after some preliminary filtering. Note that the RX signal fails to change after entering the blank area of the disc. Waveforms C and D represent the resulting TX and RX output signals, referred to as TXS and RXS, respectively, which are supplied to the track crossing counter 12. The TXS output signal corresponds to the received TX input signal, except for a small delay in the rising edge of the TXS pulse occurring immediately after detection of the blank area boundary. The RXS output signal before detection of the blank area boundary is the same as the RX input signal. If nothing were done to correct the situation, this RXS output signal would remain unchanged after entering the blank area of the disc. Apparatus 10, however, quickly provides a fake RX signal to take its place. This fake RX signal is indicated by the portion of waveform D following the point at which the blank is detected. A point to notice is that the TX and RX signal transitions in waveforms C and D occur in the same order and approximately the proper locations when passing from the recorded area to the blank area on the disc. As a consequence, the track crossing counter 12 is unaware of any disruption in operation and does not lose a count.

As seen in FIG. 1A, the TX signal from optical pickup unit 11 is supplied by way of a noise filter 13 to edge detectors 14 which produce narrow pulses corresponding to the positive-going and negative-going edges of the rectangular TX signal. These edge pulses are supplied to TX reconstruction circuits 15 to reconstruct the original TX waveform. The resulting reconstructed signal TXS is supplied to the track crossing counter 12. Reconstruction circuits 15 include a short delay circuit 16 and a long delay circuit 17, the input of which is connected to the output of the short delay circuit 16. Short delay circuit 16 provides a delay of one clock cycle (approximately 30 nanoseconds). Long delay circuit 17 provides a substantially longer delay of approximately 20 microseconds. The outputs of delay circuits 16 and 17 are connected to input terminals of a delay switch matrix 18 which chooses between the two sets of inputs, either the two inputs from short delay circuit 16 or the two inputs from long delay circuit 17. The selected set of inputs are supplied to the set (S) and the reset (R) terminals of a flip flop circuit 19. The positive edge pulses are supplied to the set terminal S and the negative pulses are supplied to the reset terminal R. The resulting signal at the output terminal Q of flip flop 19 is thus of substantially the same waveform as the original TX signal. This reconstructed signal TXS is supplied to one input of the track crossing counter 12.

As indicated in FIG. 1B, the RX signal received from the optical pickup unit 11 is supplied by way of noise filter 20 to one input of a multiplexer (MUX) circuit 21. If the optical pickup unit 11 is moving across a recorded area, this real RX signal is supplied to the output of multiplexer 21 to provide the RXS signal which is supplied to the track crossing counter 12.

A fake RX signal is continuously generated by a fake RX edge generator 22 and a quadrature signal generator 23, as shown in FIG. 1A. This fake RX signal is supplied to the second input of the multiplexer 21. It is not used unless the presence of an unrecorded or blank area on the disc is detected by a blank detector 24 (FIG. 1B). When a blank area is detected, blank detector 24 generates a blank-indicating signal which is supplied to the control terminal of multiplexer 21 to switch multiplexer 21 to pass the fake RX signal to its RXS output terminal. In this manner, the fake RX signal is used to provide the RXS output when the optical pickup unit 11 is passing over a blank area on the disc. When passing over a recorded area, the real RX signal is passed by the multiplexer 21 to provide the RXS output.

The RX pulse signal from noise filter 20 is also supplied to edge detectors 25 which produce positive edge pulses and negative edge pulses for the positive-going and negative-going transitions in the rectangular RX signal. These RX edge pulses are combined and supplied to blank detector 24. The combined positive and negative TX edge pulses produced by the TX edge detectors 14 are also supplied to the blank detector 24 by way of a conductor 46. Blank detector 24 also receives stall indicator signals from a stall detector 27 which is driven by the TX edge pulses. A SEARCH ON signal from the primary playback apparatus (not shown) is supplied to the blank detector 24 by way of conductor 28. A SEARCH DIRECTION signal from the primary playback apparatus is supplied by way of a conductor 29 (FIG. 1A) to the quadrature signal generator 23. A hard acceleration detector 30 (FIG. 1A) is provided and is responsive to the in-phase TX track crossing signals for detecting a hard acceleration of the optical pickup unit 11 and generating a hard acceleration pulse which is supplied to the quadrature signal generator 23 and a hard acceleration signal which is supplied to the blank detector 24 (to produce a TX WAIT signal).

Figure 3:
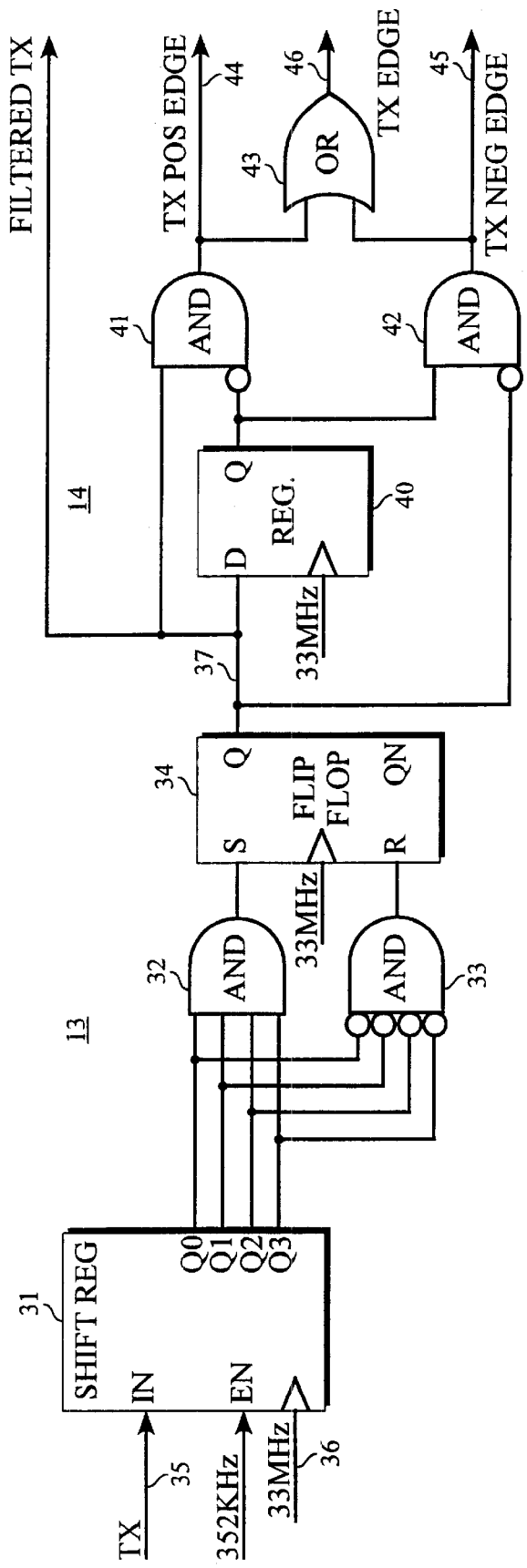
FIG. 3 is a logic circuit diagram showing in greater detail a representative form of construction for the TX signal noise filter and the TX edge detectors of FIG. 1A.

Referring to FIG. 3, there is shown in greater detail a suitable form of construction for the noise filter 13 and the edge detectors 14 of FIG. 1A. A noise filter is provided by a shift register 31, AND circuits 32 and 33 and a flip flop circuit 34. A 352 kilohertz (KHz) sampling rate signal is supplied to the enable input EN of the shift register 31 for shifting in the data value on the TX input line. During a typical search operation, the TX signal will have a maximum frequency in the neighborhood of 40 kilohertz (KHz). The 33 megahertz (Mhz) signal on line 36 is a system clock signal which is used throughout the apparatus 10 for keeping the various logic circuits in step with one another. Spurious noise spikes are masked out by the noise filter 13 by requiring a sequence of four (or two—the actual hardware allows for two choices) consecutive one level samples of the TX signal to signify a logic high (binary one) condition and four consecutive low samples to signify a logic low condition of the TX signal. With a 352 kilohertz sampling of the lower frequency TX signal, this effectively cuts off frequencies higher than 44 kilohertz (or 88 kilohertz, if two consecutive samples are used). When TX is high, then as soon as four consecutive high samples are read into shift register 31, AND circuit 32 is turned on to set flip flop 34 to the set (binary one) condition. During a TX low half cycle, as soon as four consecutive lows are read into the shift register 31, the other AND circuit 33 is activated to reset the flip flop 34 to the binary zero state. As a consequence, there appears on output line 37 of flip flop 34 a replica of the original TX signal except in a filtered condition.

TX edge detectors 14 are comprised of a one-bit register 40, a pair of AND circuits 41 and 42, and an OR circuit 43. A set of narrow pulses corresponding to the positive-going transitions in the TX signal are produced on output line 44, while a corresponding set of narrow pulses corresponding to the negative-going edges of the TX signal appear on output line 45. A composite TX edge signal having narrow pulses for both the positive-going and negative-going transitions appears on output line 46.

Figure 4:
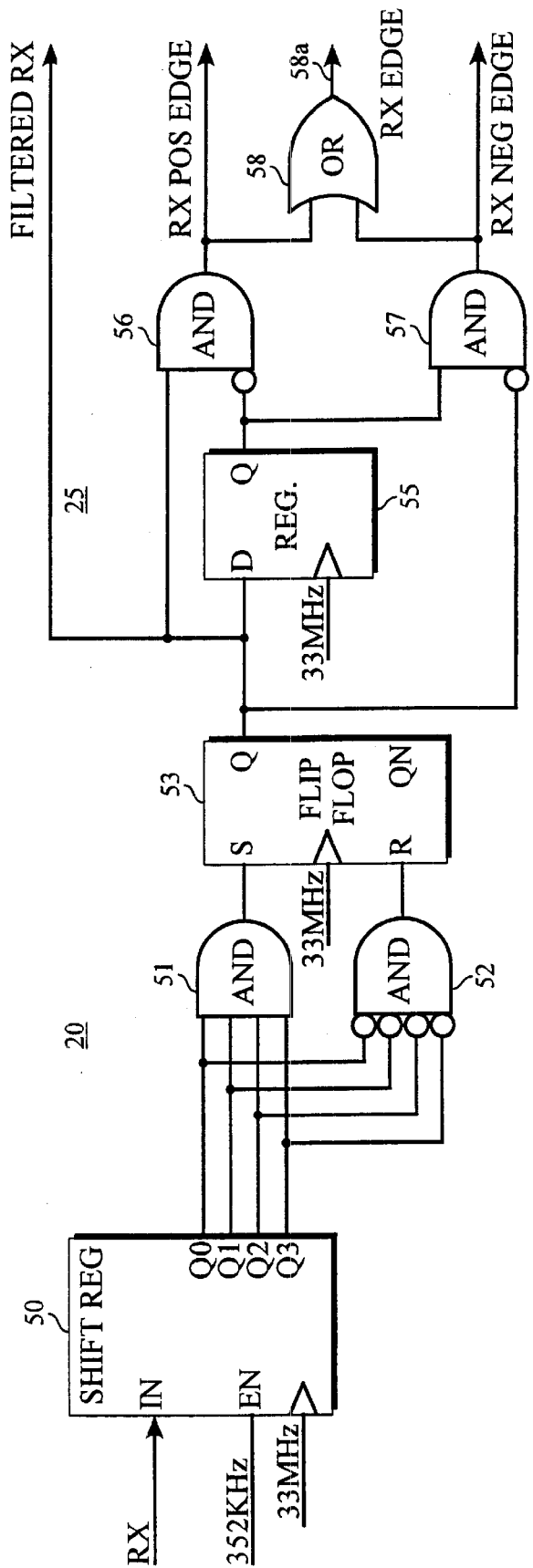
FIG. 4 is a logic circuit diagram showing in greater detail a representative form of construction for the RX signal noise filter and the RX edge detectors of FIG. 1B.

Referring now to FIG. 4 there is shown in greater detail a suitable form of construction for the RX noise filter 20 and the RX edge detectors 25 of FIG. 1B. The noise filter 20 includes a shift register 50, a pair of AND circuits 51 and 52 and a flip flop circuit 53 connected in cascade as shown. Edge detectors 25 include a one-bit register 55, AND circuits 56 and 57 and OR circuit 58. This noise filter 20 and these edge detectors 25 are of the same construction as shown in FIG. 3 for the TX noise filter 13 and the TX edge detectors 14. They operate in the same manner as described above for the corresponding TX circuits.

Figure 5:
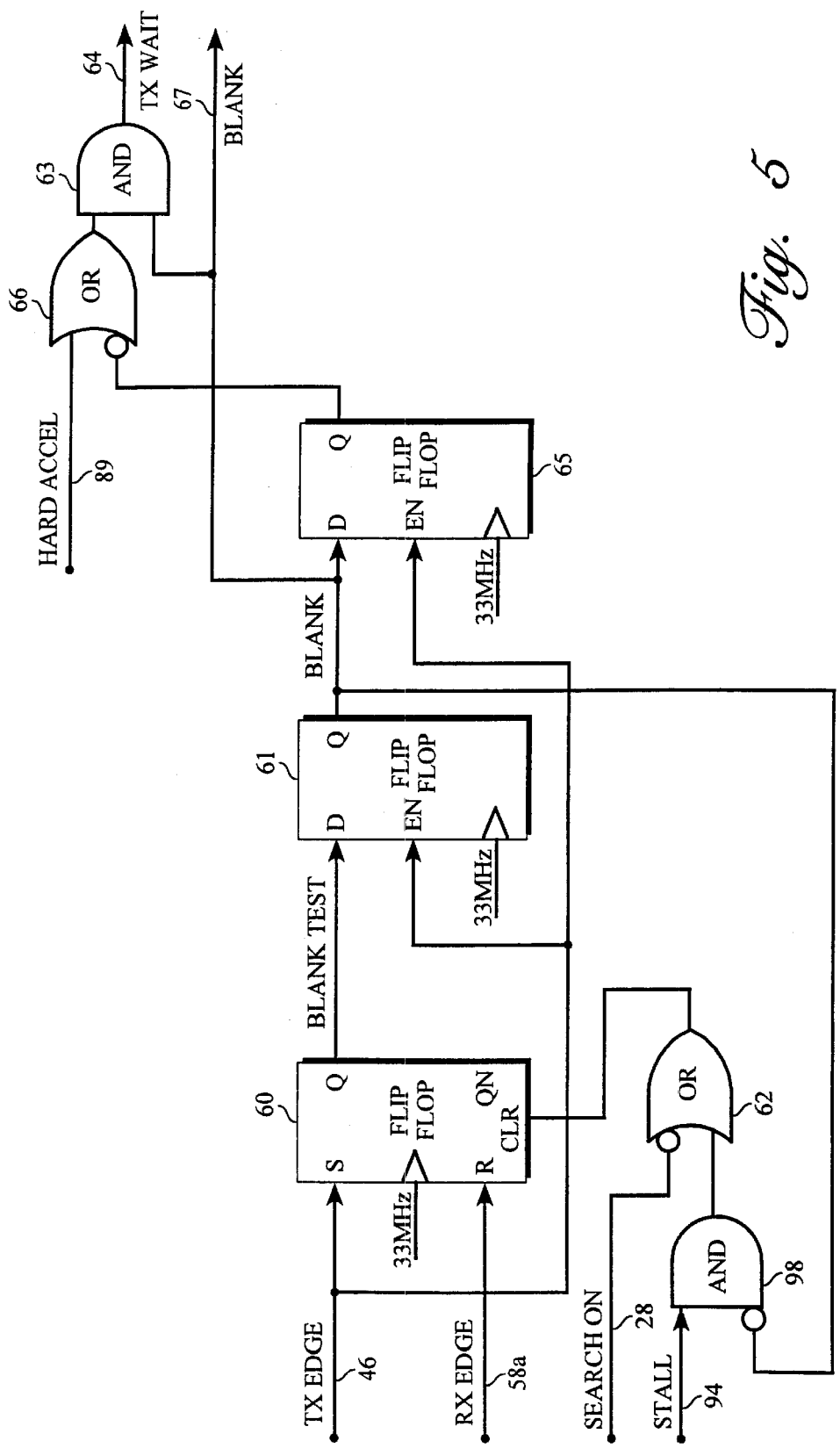
FIG. 5 is a logic circuit diagram showing in greater detail a representative form of construction for the blank detector of FIG. 1B.

Referring to FIG. 5 there is shown a logic circuit diagram showing in greater detail a representative form of construction for the blank detector 24 of FIG. 1B. The basic purpose of the blank detector 24 is to compare the in-phase TX with the quadrature-phase RX signal to detect the absence of an RX signal transition between two successive in-phase TX signal transitions. A blank condition is declared if no RX signal edge appears between two successive TX signal edges. Such occurrence causes a BLANK signal to be produced on the output line which runs to the RX signal multiplexer 21. This switches multiplexer 21 to substitute the fake RX signal for the now missing real RX signal.

The comparing action is provided by a pair of bistable (flip flop) circuits 60 and 61. The first bistable circuit 60 has a set input terminal S, a reset input terminal R and an output terminal Q. The second bistable circuit 61 has a data input terminal D, an enable data read in terminal EN and an output terminal Q. The combined TX edge pulses (for both positive-going and negative-going edges) from TX edge detector 14 are supplied via line 46 to the set input terminal of the first bistable circuit 60 and to the enable data read-in terminal EN of the second bistable circuit 61. The combined RX edge pulses (both positive-going and negative-going RX edges) from the RX edge detectors 25 are supplied via line 58a to the reset input terminal R of the first bistable circuit 60. The output terminal Q of the first bistable circuit 60 is connected to the data input terminal D of the second bistable circuit 61.

Figure 6:
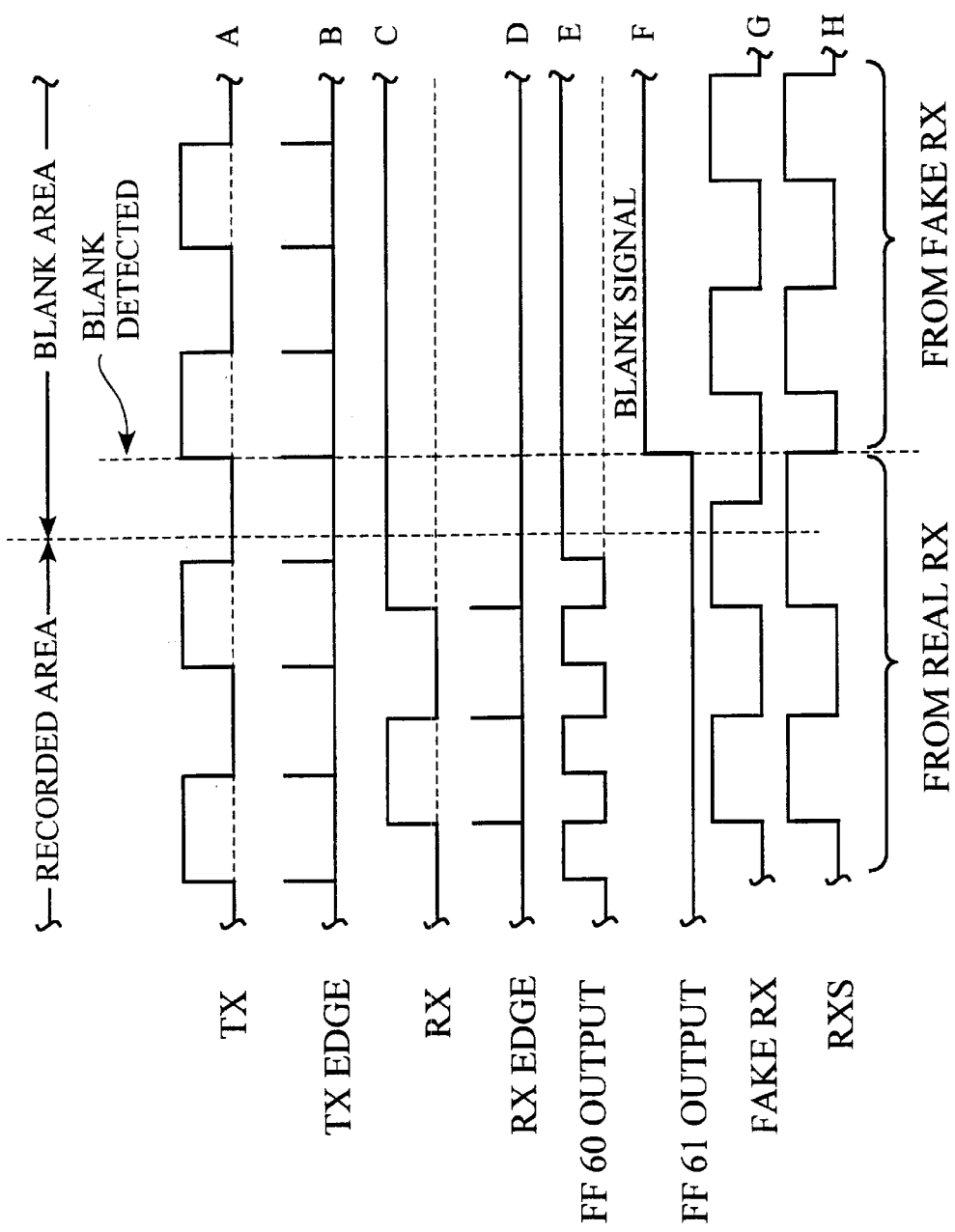
FIG. 6 is a timing diagram used in explaining the operation of the FIG. 5 blank detector.

The operation of the bistable circuits 60 and 61 will be explained with the aid of the timing diagram of FIG. 6. Waveform A of FIG. 6 shows the filtered TX signal and waveform B shows the corresponding TX edge pulses. The TX edge pulses represented by waveform B are supplied to the set input terminal S of the first bistable circuit 60. The filtered RX signal is represented by waveform C and the corresponding RX edge pulses are represented by waveform D. These RX edge pulses of waveform D are supplied to the reset input terminal R of the first bistable circuit 60. As long as the optical pickup head 11 is traversing a recorded area of the disc, the RX edge pulses of waveform D will continue to appear. During such time, bistable circuit 60 will be alternately set and reset by the TX and RX edge pulses. The resulting signal appearing at the output terminal Q of bistable circuit 60 is represented by waveform E of FIG. 6.

When the pickup head 11 moves into a blank area of the disc, the RX signal is lost and the RX edge pulses no longer appear. This occurrence is detected by the second bistable circuit 61. The TX edge pulses supplied to the enable input terminal EN of bistable circuit 61 read into the bistable circuit 61 whatever binary data value is appearing at the output terminal Q of the first bistable circuit 60. As long as bistable circuit 60 is being alternately set and reset, its output terminal Q will be at a binary zero level whenever a TX edge pulse occurs. Thus, the second bistable circuit 61 will remain in the binary zero condition so long as the RX edge pulses continue to appear.

When the pickup head 11 enters a blank area, the first bistable circuit 60 is no longer reset and the signal at its output terminal Q remains at the binary one level as shown in waveform C. The next occurring TX edge pulse reads this binary one value into the second bistable circuit 61. This causes the output terminal Q of the second bistable circuit 61 to go to a binary one level. This is represented by waveform F which represents the output of the second bistable circuit 61. This binary one level at the output of bistable circuit 61 is the BLANK signal which is used to switch the RX signal multiplexer 21 to pass the fake RX signal to the RXS output terminal of multiplexer 21. The fake RX signal is being continuously generated and is represented by waveform G in FIG. 6. Waveform H represents the composite RXS signal appearing at the output of multiplexer 21. Before the blank area is detected, this composite RXS signal is derived from the real RX signal supplied to multiplexer 21. After the blank area is detected, this composite RXS signal is derived from the fake RX signal supplied to multiplexer 21.

In order to maintain the quadrature relationship of having one RX signal edge in between each pair of TX signal edges, the first TX edge following detection of a blank area must be delayed by a fraction of an in-phase TX signal cycle. This is accomplished by generating a "TX WAIT" signal from the BLANK signal appearing at the output of bistable circuit 61. More particularly, the BLANK signal is supplied by way of AND circuit 63 to provide a TX WAIT signal on output line 64. This TX WAIT signal is supplied to the delay switch matrix 18 to cause it to select the delayed TX edge pulses appearing at the output of long delay circuit 17 for use in driving the reconstruction flip flop 19. This provides a 20 microsecond delay (or other desired value of delay) for the TX edge immediately following the detection of a blank area. This delayed TX edge is shown in waveform C of FIG.

2. This delay keeps the right sequence of an RX edge followed by a TX edge which is needed by the track crossing counter 12.

The next ensuing TX edge supplied to the enable input terminal EN of a third flip flop circuit 65 reads in the BLANK signal binary one level at its data input terminal D and sets the output Q of the flip flop 65 to the binary one level. This is inverted by the inverting input of an OR circuit 66 to supply a binary zero level to the second input of AND circuit 63. This turns off the TX WAIT signal on output line 64. Thus, only the first TX edge following blank detection is delayed by the 20 microsecond interval. The BLANK signal itself is unaffected by this operation and it continues to be supplied by way of output line 67 to the RX signal multiplexer 21.

The SEARCH ON signal supplied by way of the primary part of the disc player apparatus via conductor 28 is inverted and supplied to the second input of OR circuit 62. This enables the BLANK signal to be supplied to the output line 67 only when a track search is being made. When not in a search mode, conductor 28 is at a binary zero level which is inverted at the input of OR circuit 62 to enable OR circuit 62 to supply a binary one level to the clear terminal CLR of flip flop circuit 60. This clears flip flop 60, disabling the BLANK signal on conductor 67 and the TX WAIT signal on conductor 64.

Figure 7:
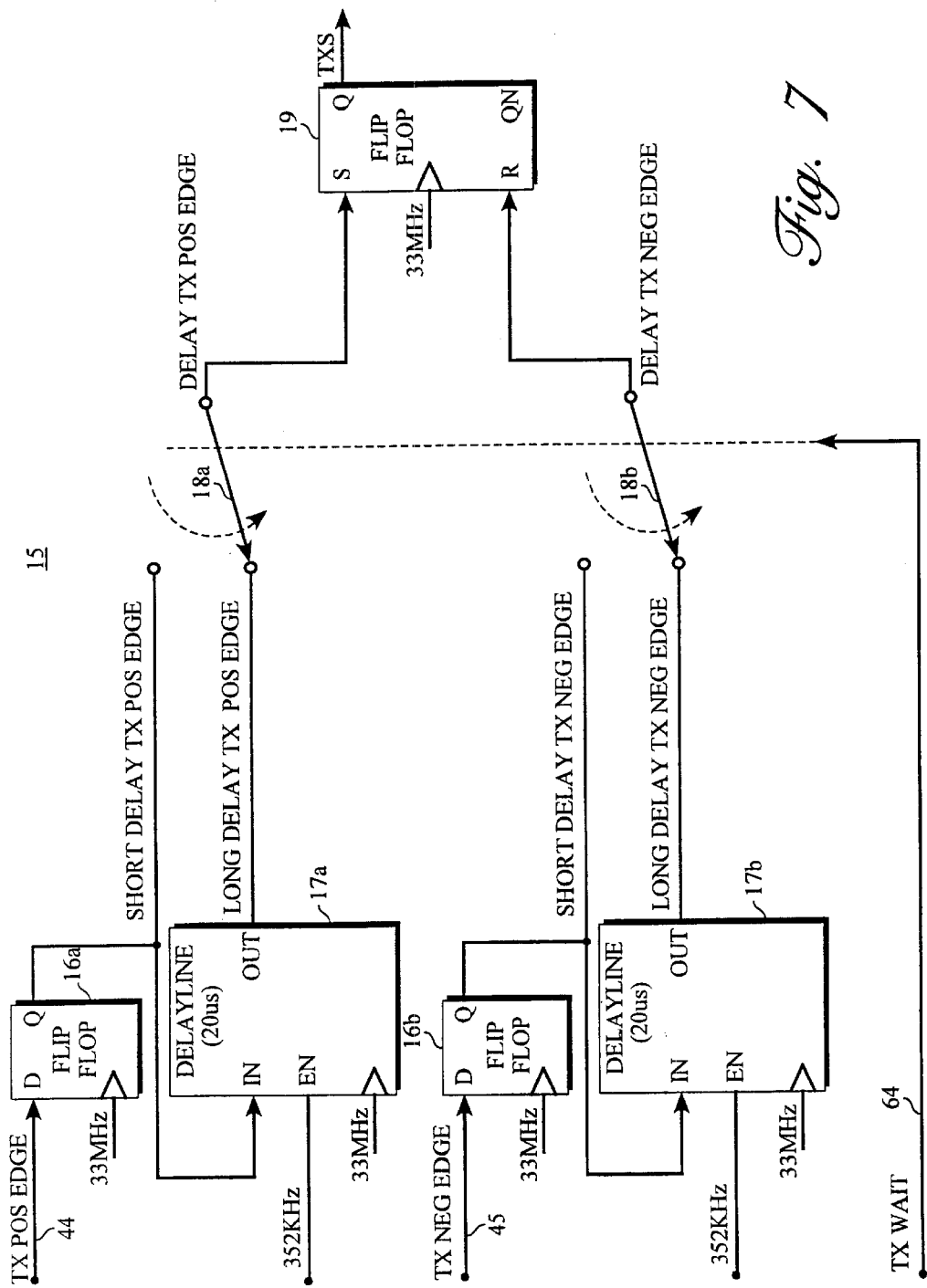
FIG. 7 is a logic circuit diagram showing in greater detail a representative form of construction for the TX signal output circuits of FIG. 1A.

Referring now to FIG. 7, there is shown in greater detail an appropriate form of construction for the TX signal reconstruction circuits 15 of FIG. 1A. The TX positive edge pulses from edge detectors 14 are supplied to a flip flop circuit 16a to produce at its output terminal Q very slightly delayed positive edge pulses. This delay is the short delay of approximately 30 nanoseconds. The short delayed positive edge pulses are supplied to the input of a long delay circuit 17a. Switch element 18a selects between the long and short delayed TX positive edge pulses. The long delay provided by delay circuit 17a is approximately 20 microseconds.

A similar arrangement is provided for the TX negative edge pulses appearing on line 45. They are supplied to a short delay circuit represented by a flip flop circuit 16b and the shortly delayed pulses are supplied to a long delay circuit 17b. Switch element 18b selects between the short delay and the long delay negative edge pulses. The long delay is again approximately 20 microseconds.

The selected positive edge pulses drive the set terminal S of output flip flop circuit 19, while the selected negative edge pulses drive the reset terminal R of flip flop 19. This produces at the output terminal Q of flip flop 19 a replica or reconstructed version of the original filtered TX signal appearing at the output of noise filter 13. This reconstructed output is shown by waveform C of FIG. 2.

Switches 18a and 18b are actually electronic switches and, in particular, each may take the form of a two input multiplexer circuit. These switches (or multiplexers) 18a and 18b are controlled by the TX WAIT signal supplied by blank detector 24 by way of line 64. Normally, switches 18a and 18b are set to select the short delay edge pulses. They are briefly switched to select the long delay edge pulses by the occurrence of the TX WAIT signal from blank detector 24. This provides the 20 microsecond delay shown for the leading edge of the TXS output pulse first occurring after detection of a blank (see waveform C of FIG. 2). The one cycle (30 nanosecond) very short delay provided by short delay circuits 16a and 16b are needed for delaying the selection of the TXS transitioning until the blank detection is ready.

Figure 8:
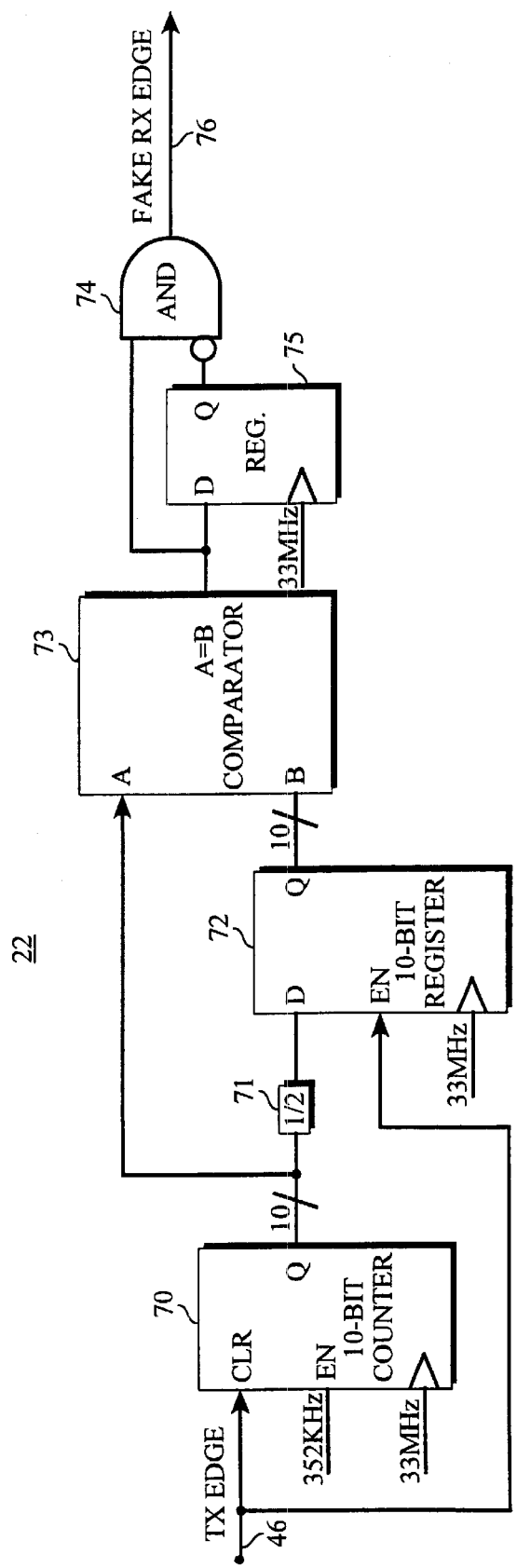
FIG. 8 is a logic circuit diagram showing in greater detail a representative form of construction for the fake RX edge generator of FIG. 1A.

Referring to FIG. 8, there is shown in greater detail a suitable form of construction for the fake RX edge generator 22 of FIG. 1A. This fake RX edge generator includes a plural-bit (e.g., 10 bit) counter 70, a divide by two circuit 71, a plural-bit (e.g., 10 bit) register 72, and a comparator circuit 73. The purpose is to generate fake RX edge pulses midway between successive TX edge pulses. The TX edge pulses on line 46 are supplied to the clear terminal (CLR) of counter 70 to clear counter 70 to a zero count condition. Following each such edge pulse, counter 70 commences to count the 352 kilohertz sampling pulses supplied to the enable terminal EN of counter 70. One-half of the count value in counter 70 is continuously supplied to the data input D of plural-bit register 72 by way of the divide-by-two circuitry 71. Circuitry 71 is formed by connecting the appropriate stages of counter 70 to the appropriate input stages in register 72 so that the binary count supplied to register 72 is one-half the value of the binary count in counter 70. The next ensuing TX edge pulse supplied to the enable input EN of register 72 reads into the register 72 the half count value at the data input D of register 72. At the same time, this TX edge pulse resets or clears the counter 70 and such counter again begins to count the 352 kilohertz sampling pulses. Comparator 73 compares the count in counter 70 with the half count value stored in register 72 for the previous TX edge cycle. When the count in counter 70 for the new TX edge cycle becomes equal to the half count value for the previous TX edge cycle, the output of comparator 73 goes to a binary one level.

The output of comparator 73 is connected to AND circuit 74 and the data input of a one-bit register 75. The output Q of register 75 is connected to an inverting input of AND circuit 74. This combination of AND circuit 74 and register 75 responds to a positive-going transition at the output of comparator 73 to produce a narrow fake RX edge pulse on output line 76. This fake edge pulse is of approximately 30 nanoseconds duration and appears at the halfway point between TX edge pulses as determined by the halfway count for the immediately preceding TX edge cycle. As long as the optical pickup unit 11 is moving at a relatively constant speed, this newly-created RX edge pulse will appear approximately midway between two TX edge pulses.

Figure 9:
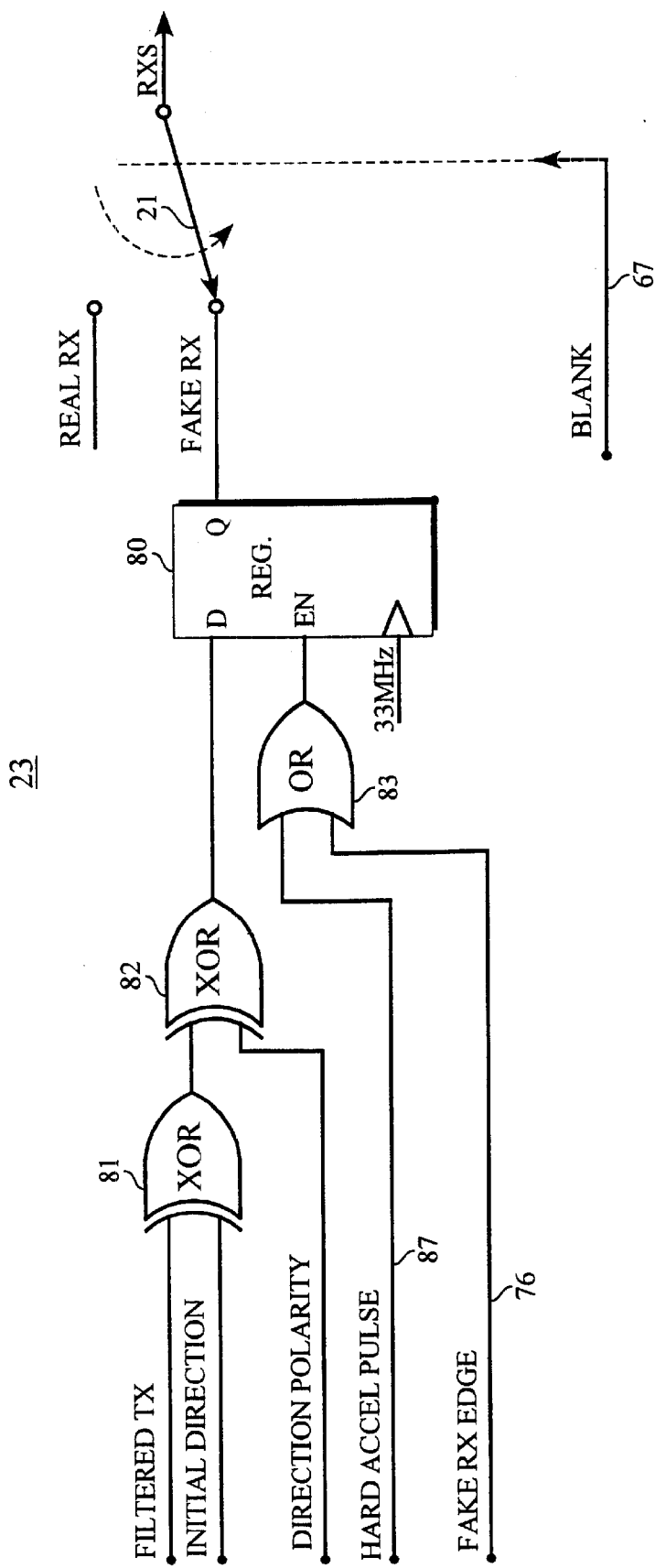
FIG. 9 is a logic circuit diagram showing in greater detail a representative form of construction for the quadrature-signal generator of FIG. 1A.

Referring to FIG. 9, there is shown in greater detail a suitable form of construction for the quadrature signal generator 23 of FIG. 1A. The purpose of this quadrature signal generator 23 is to generate a fake RX signal which looks like the TX signal but is shifted in phase by 90° relative to the TX signal. This is accomplished by supplying the filtered TX signal from noise filter 13 to a data input terminal D of a register 80. This signal is supplied to terminal D by way of exclusive OR circuits 81 and 82. The fake RX edge pulses from fake edge generator 22 are supplied by way of an OR circuit 83 to the enable data read-in terminal EN of the register 80. In effect, the fake edge pulses serve to sample the values of the filtered TX signal at the mid points between TX signal transitions. Thus, the output of register 80 provides a replica of the TX signal shifted by a factor of 90° relative to the actual TX signal. This fake RX signal is supplied by way of multiplexer 21 to provide the RXS signal for the track crossing counter 12 when a BLANK signal is present on multiplexer control line 67. Exclusive OR circuits 81 and 82 act as polarity switches for setting up the lead-lag relationship between the TXS signal and the fake RXS signal.

A complication arises when a track search is started when the optical pickup unit 11 is already in a blank area of the disc. In such case, the initial "hard" acceleration of pickup head 11 causes the next fake RX edge pulse to arrive too late.

Figure 10:
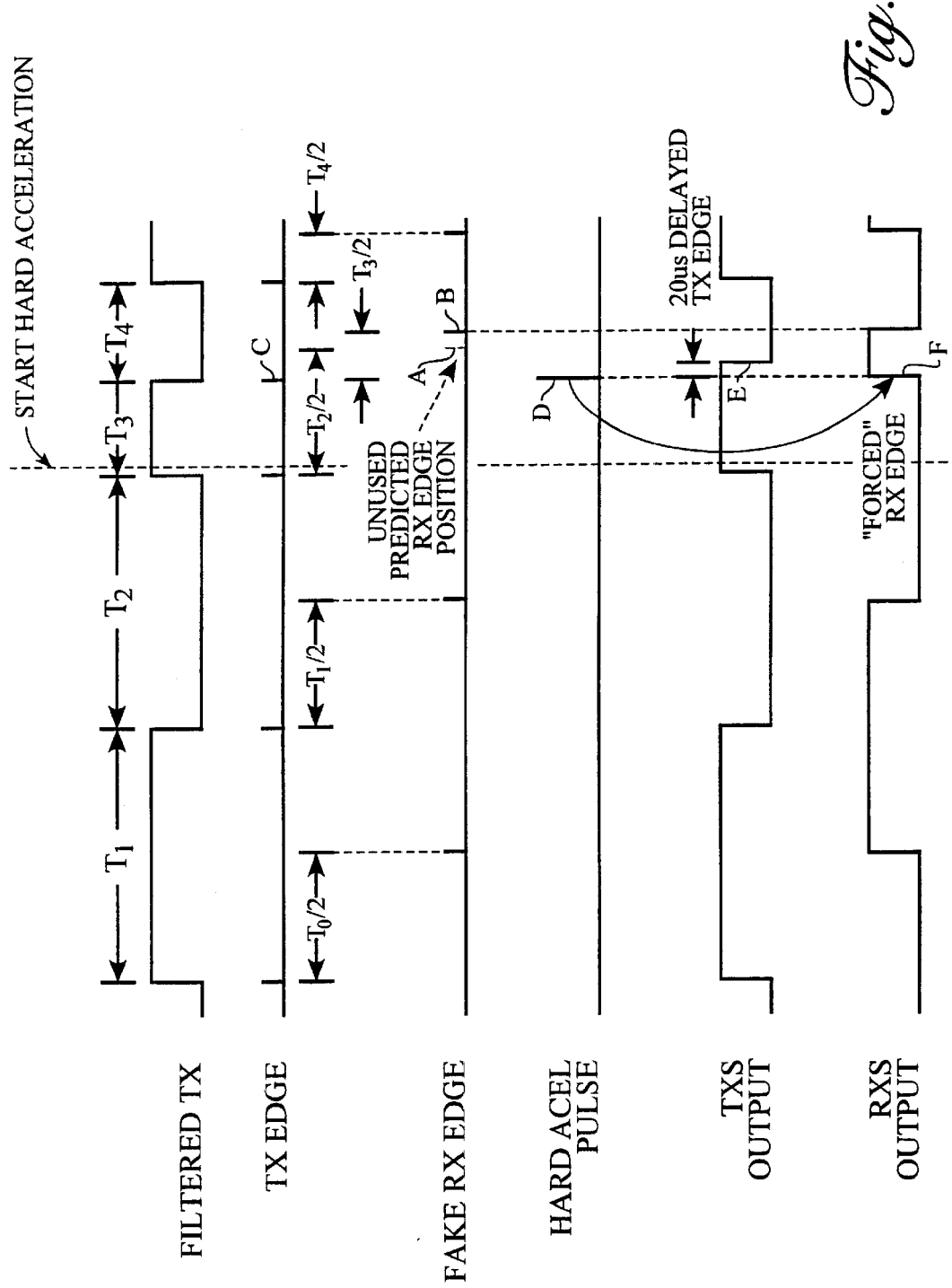
FIG. 10 is a timing diagram used in explaining the operation of the hard acceleration detector of FIG. 1A.

This situation is shown by the waveforms of FIG. 10 wherein the T3 and T4 TX intervals show the shortening of the TX signal due to such hard acceleration, with the predicted but late false RX edge pulse being indicated at A. As a counter measure, the hard acceleration detector 30 detects when the fake RX edge pulse fails to arrive on time and processes both TXS and RXS signals in the following sequence: the TXS signal edge is delayed by 20 microseconds (edge E in FIG. 10); the fake RX signal is forced to transition early at the point where the undelayed TXS edge would have been (see forced RX edge at F in FIG. 10); and the next fake RX edge pulse (shown at B in FIG. 10) derived from the newly shortened TX edge interval is allowed to generate an RXS signal transition after the delayed TXS transition.

Figure 11:
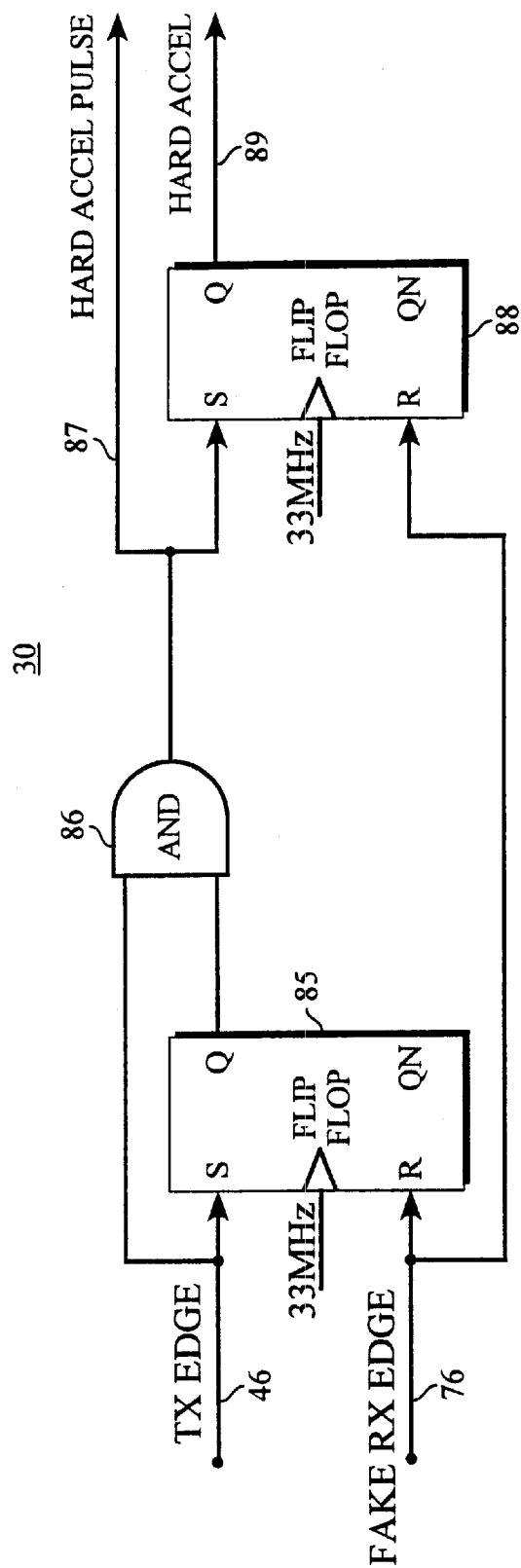
FIG. 11 is a logic circuit diagram showing in greater detail a representative form of construction for the hard acceleration detector of FIG. 1A.

FIG. 11 shows a suitable form of construction for the hard acceleration detector 30 of FIG. 1A. The TX edge pulses from TX edge detectors 14 (FIG. 3) are supplied to the set input terminal S of a flip flop circuit 85 and to a first input terminal of an AND circuit 86. The Q output terminal of flip flop 85 is connected to the second input of AND circuit 86. The fake RX edge pulses from fake RX edge generator 22 (FIG. 8) are supplied to the reset input terminal R of flip flop 85. Under conditions where the optical pickup unit 11 is moving at a relatively constant speed, the fake RX edge pulse will arrive in between two TX edge pulses. In such case, flip flop 85 alternates back and forth between its set and reset states. When the optical pickup unit 11 is switched to a track search mode, it initially undergoes a hard acceleration. This compresses the TX signal cycle and causes the "calculated" fake RX edge pulse to arrive late, that is, to arrive after the next TX edge pulse.

This hard acceleration condition is detected by detecting the failure of a fake RX edge pulse to arrive between two successive TX edge pulses. In such case, it is assumed that the TX signal period is shrinking and that the optical pickup head 11 is undergoing rapid acceleration. This is detected by the flip flop circuit 85, where the fake RX edge signal fails to reset flip flop 85 before the arrival of the next TX edge pulse (pulse C in FIG. 10). This failure to reset flip flop 85 enables AND circuit 86 to pass this next this TX edge pulse to provide a hard acceleration indicator pulse on line 87.

This hard acceleration pulse (pulse D in FIG. 10) is supplied to the set input terminal S of a second flip flop circuit 88. This sets flip flop 88 to the binary one state and produces a binary one level on the Q output line of flip flop 88. This binary one level is used as a hard acceleration signal and is supplied by way of output line 89 to OR circuit 66 in the blank detector 24 (FIG. 5). Since the pickup head 11 is in a blank region of the disc, this produces a TX WAIT signal on output line 64 of the blank detector. This TX WAIT signal is supplied to the delay switch matrix 18 to provide the 20 microsecond delay for the next edge (edge E in FIG. 10) of the TXS output signal.

The hard acceleration pulse (pulse D in FIG. 10) produced on output line 87 is supplied to the quadrature signal generator 23 (FIG. 9) to force the RXS output signal to undergo a transition, this being the transition indicated at F in FIG. 10. Thus, there is a forced RX transition before the next TX signal transition. This provides the proper sequence of events for the track crossing counter 12 so that no count is lost.

Another possible complication is the occurrence of a stall condition due to eccentricity of the recorded track when the optical pickup head 11 is doing a track search across a recorded portion of the disc. A stall can cause either two RX edges to happen in between a TX edge pair or no RX edge to occur between a TX edge pair. This may cause the blank detector 24 to erroneously decide that the optical pickup head 11 is in a blank region of the disc when the RX signal edge is missing. To counter this problem, the stall detector 27 provides a signal indicating an extremely low track crossing speed characteristic of a stall. This stall signal is used to inhibit the blank detector 24 from declaring the occurrence of a blank region when the optical pickup unit 11 is, in fact, in a data region or recorded region of the disc when the stall occurred.

Figure 12:
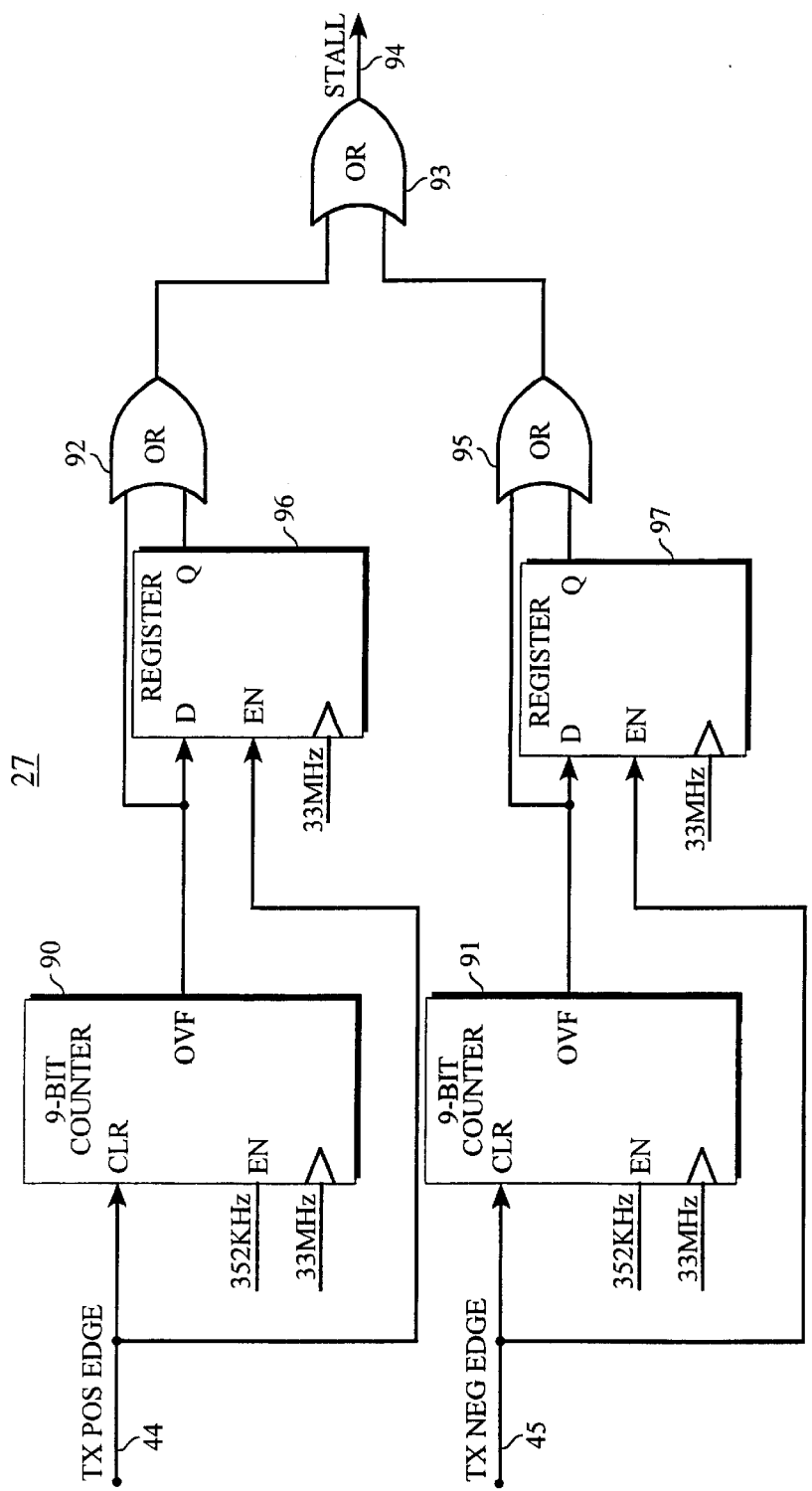
FIG. 12 is a logic circuit diagram showing in greater detail a representative form of construction for the stall detector of FIG. 1B.

FIG. 12 shows a suitable form of construction for the stall detector 27. This stall detector 27 measures the time period between the positive edges and the negative edges of the TX signal. If either measurement produces an overflow pulse, this indicates that the track crossing frequency is relatively low and it is assumed that such low frequency is a result of an eccentricity induced stall. The measuring circuit for the positive edges of the TX signal is a plural-bit counter 90. The measuring circuit for the negative edges of the TX signal is a second plural-bit counter 91. In each case, the edge pulse is supplied to the clear (CLR) terminal of the counter and the counter operates to count the 352 kilohertz sampling pulses supplied to the enable (EN) terminal of the counter. Counters 90 and 91 are provided with saturating logic so that the incrementing count will not roll over back to zero following an overflow. If either of these counters 90 and 91 generates an overflow pulse at its overflow (OVF) terminal, then the counters are not being cleared fast enough by the TX edge pulses and the TX frequency is in the stall region.

An overflow signal from positive edge counter 90 is supplied by way of OR circuits 92 and 93 to the stall detector output line 94. The overflow signal from the second counter 91 is supplied by way of OR circuit 95 and OR circuit 93 to the same stall detector output line 94. Registers 96 and 97 are provided for respective ones of the counters 90 and 91 in order to provide a one cycle storage of any overflow signal produced by their respective counter. Counters 90 and 91 may be, for example, nine-bit binary counters and can be implemented to overflow at either 512 counts or 256 counts.

Any stall signal produced on stall detector output line 94 is supplied to AND circuit 98 in blank detector 24, as shown in FIG. 5. The output of blank detector flip flop 61 is supplied to the second input, in this case an inverting input of the AND circuit 98. The output of flip flop 61 is at a binary zero level when the pickup head 11 is in a recorded area of the disc. This enables the AND circuit 98 so that the occurrence of any stall signal from stall detector 27 will be passed on by way of OR circuit 62 to the clear (CLR) terminal of the first blank detector flip flop 60 to place same in a clear condition. This prevents the generation of a blank signal on the Q output line of flip flop 60 and, hence, on the Q output line of the second flip flop 61. Thus no BLANK signal will be generated when the pickup head 11 is in a recorded area and a stall condition occurs.

Figure 13:
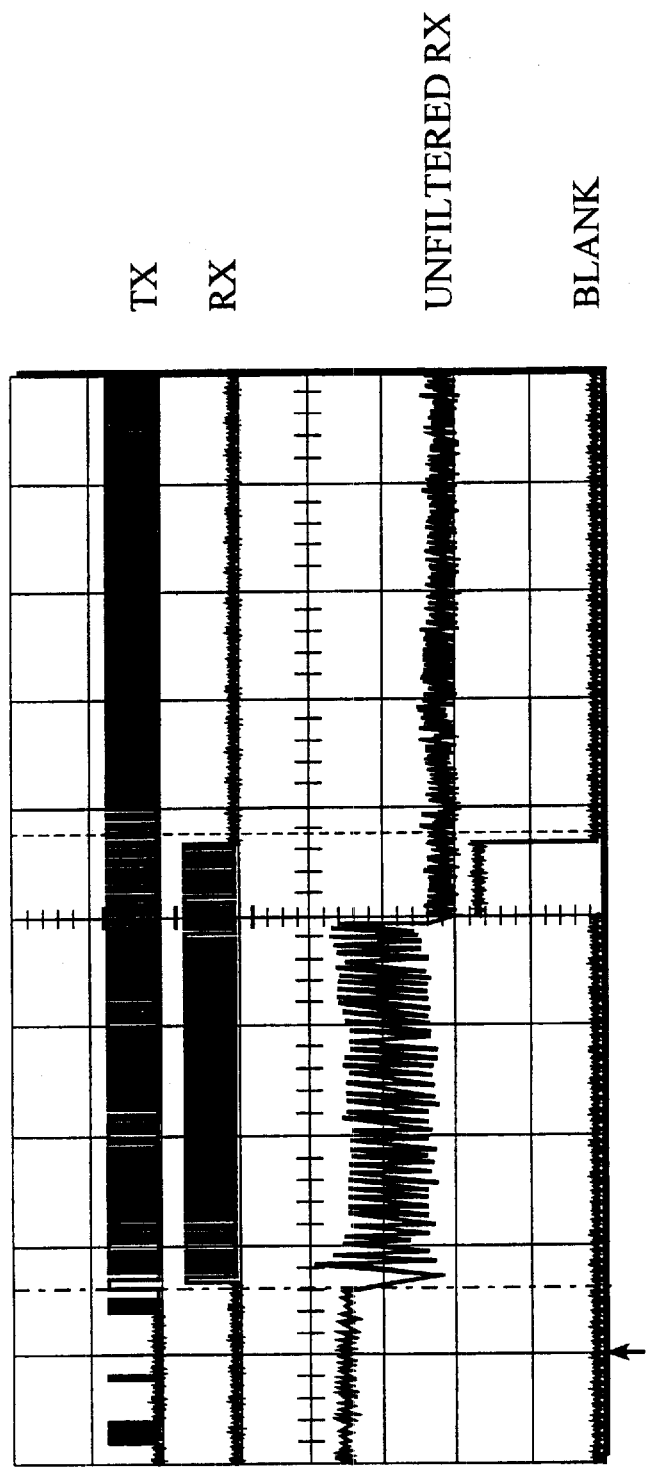
FIG. 13 is a reproduction of an oscilloscope display of signals generated when an optical pickup head moves from a recorded area to an unrecorded area of an optical disc.
Figure 14:
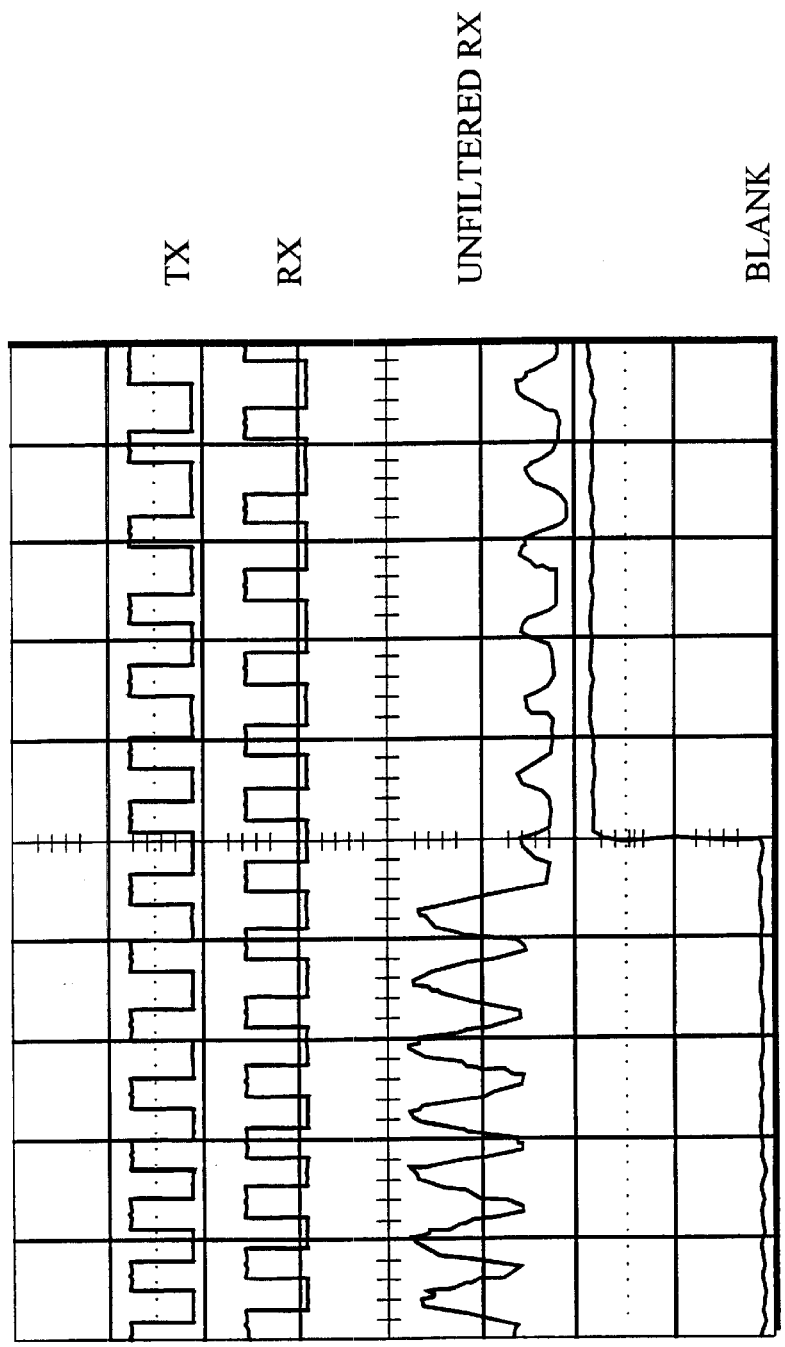
FIG. 14 is an enlargement of the center portion of FIG. 13.
Figure 15:
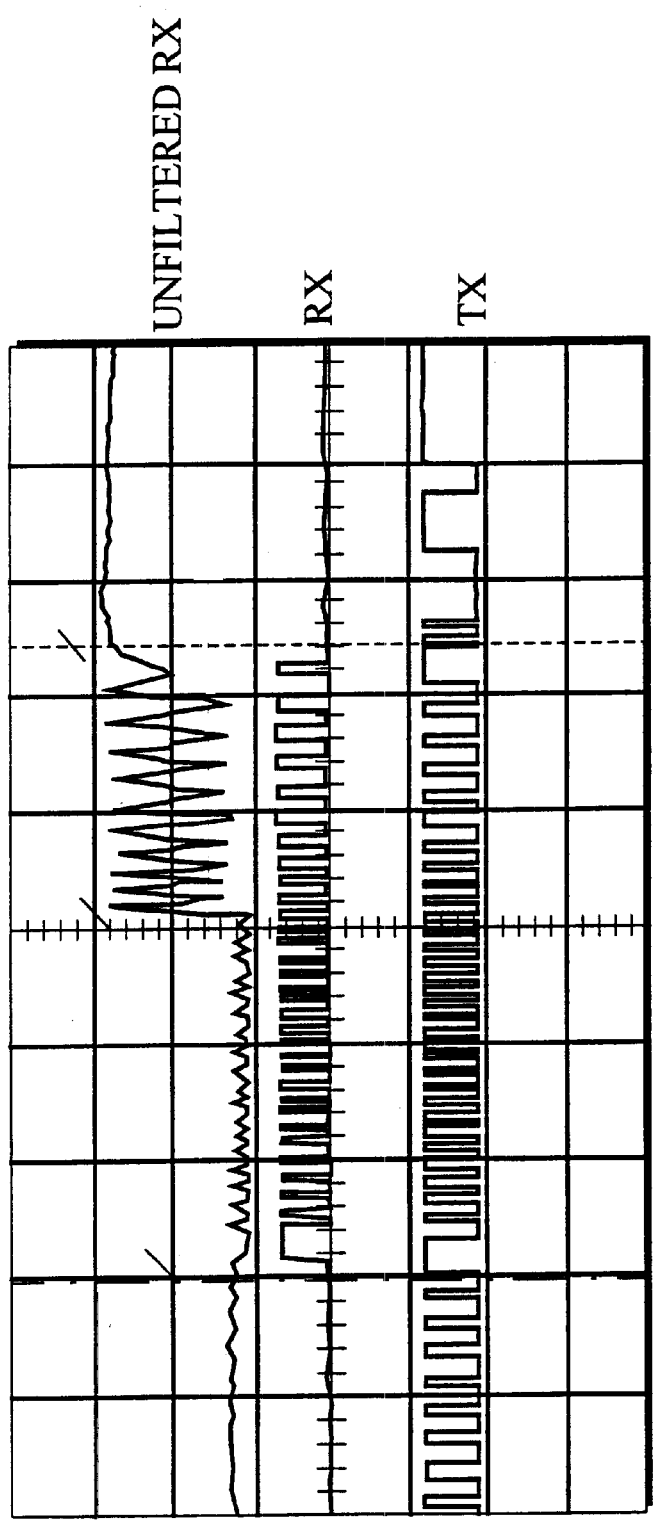
FIG. 15 is a reproduction of an oscilloscope display of signals generated when an optical pickup head moves from a blank area to a recorded area of an optical disc.
Figure 16:
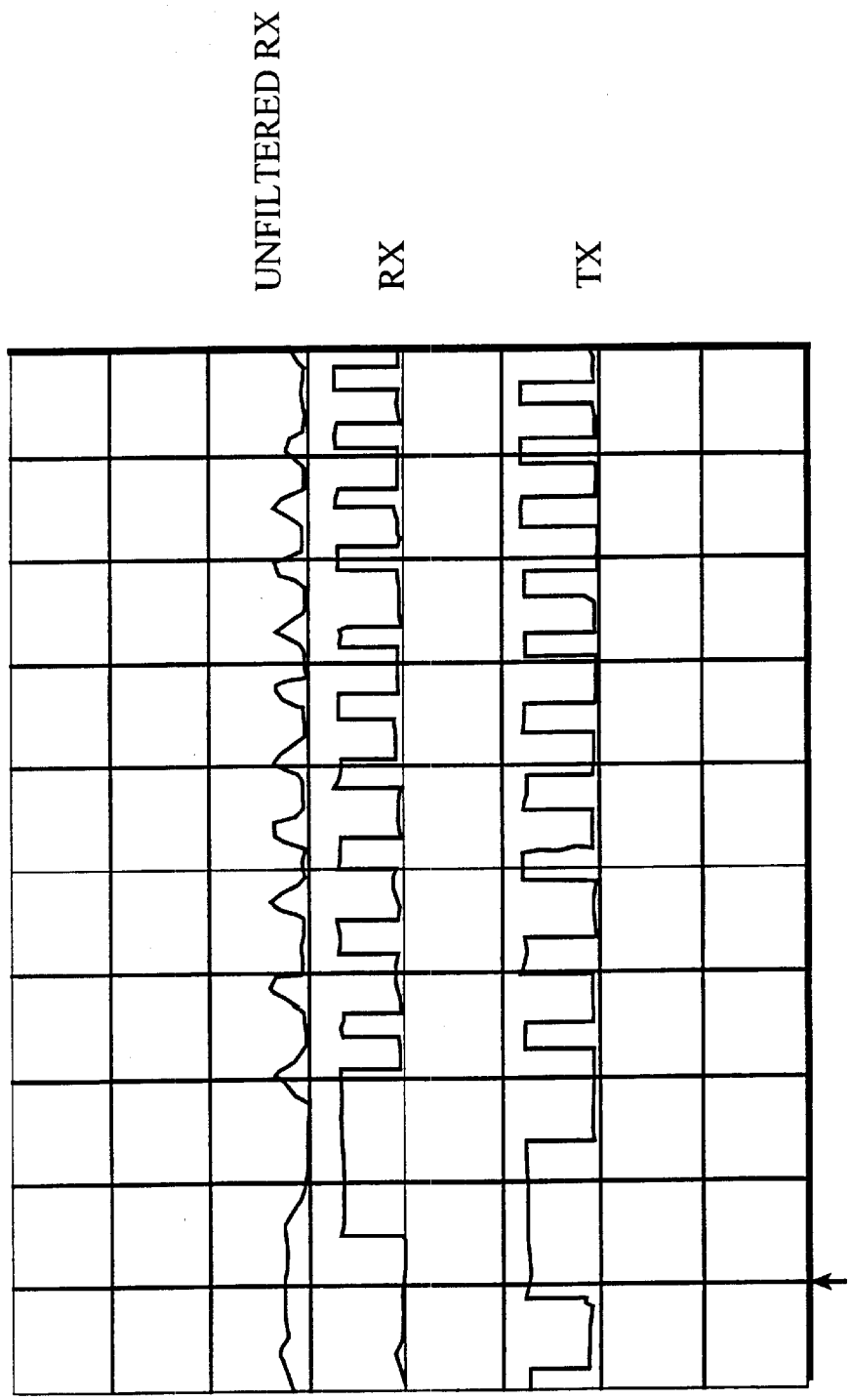
FIG. 16 is an enlargement of the beginning portion of FIG. 15 showing signals generated where the track search starts in a blank area of the optical disc.
Figure 17:
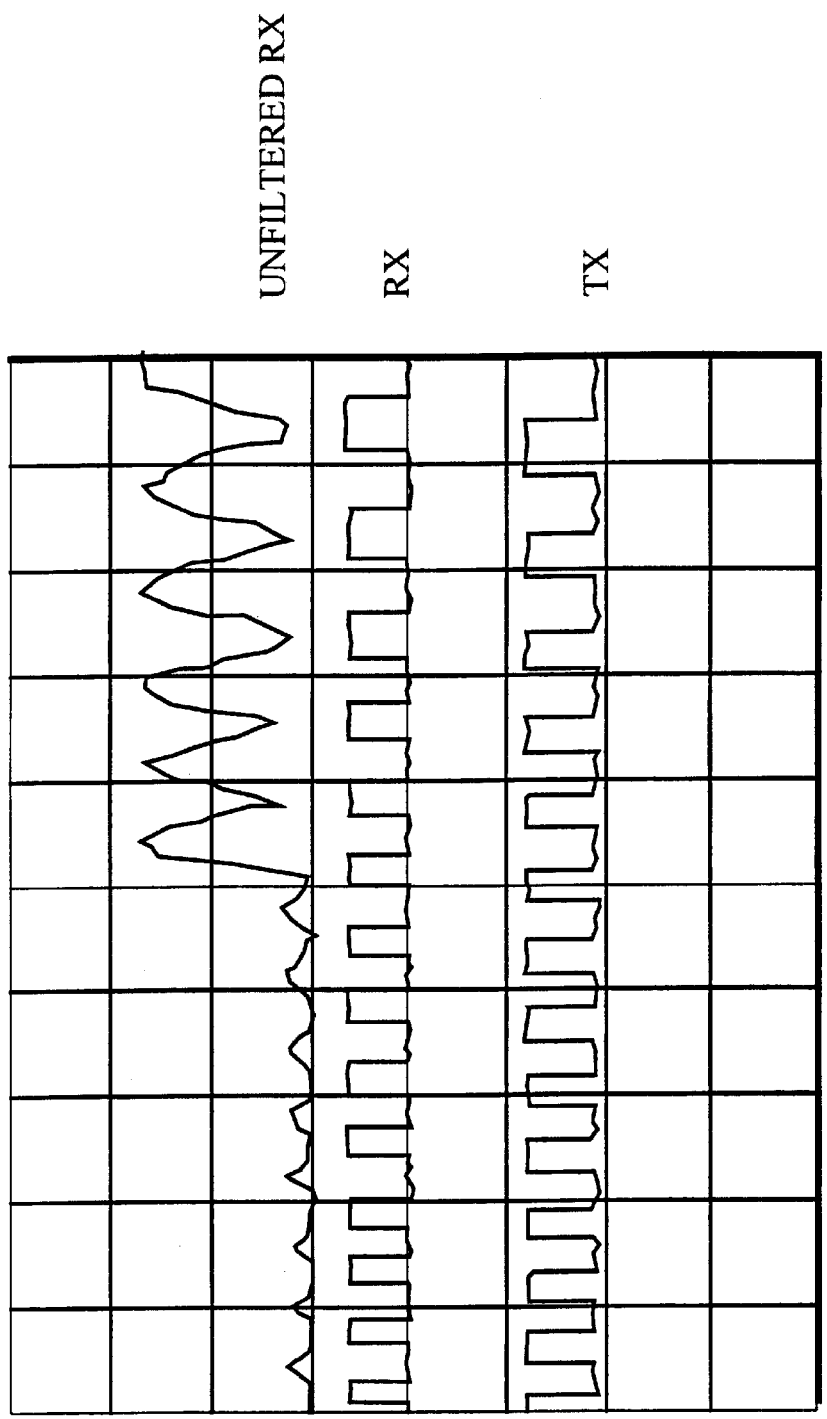
FIG. 17 is an enlargement of that portion of FIG. 15 starting shortly before and ending shortly after the optical pickup head crosses the blank to recorded area boundary on the optical disc.

FIGS. 13–17 are reproductions of oscilloscope display signals obtained with the above described apparatus. FIG. 13 shows the TX, RX and BLANK signals generated as the optical pickup head 11 moved from a recorded area to an unrecorded area of the optical disc. FIG. 14 is an enlargement of the center region of FIG. 13. FIG. 15 shows the signals generated for the reverse case where the optical pickup head 11 moved from a blank area to a recorded area on the optical disc during the course of a track search. FIG. 16 is an enlargement of the beginning portion of FIG. 15 showing the signals generated when the track search starts in a blank area of the optical disc. FIG. 17 is an enlargement of that portion of FIG. 15 immediately before, during and immediately after the optical pickup head 11 crosses the blank to recorded area boundary on the optical disc.

While there have been described what are at present considered to be preferred embodiments of this invention, it will be obvious to those skilled in the art that various changes and modifications may be made therein without departing from the invention and it is, therefore, intended to cover all such changes and modifications as come within the true spirit and scope of the invention.

What is claimed is:

1. A method of regenerating quadrature-phase track crossing signals for track searches across unrecorded areas on read/write compact discs, the method comprising:

receiving and examining in-phase and quadrature-phase track crossing signals from an optical pickup unit and supplying the crossing signals to a track crossing counter mechanism;

generating a blank signal when no quadrature-phase signal appears between two in-phase signal transitions;

generating fake quadrature-phase signals; and supplying a fake quadrature-phase signal to the track crossing counter mechanism in place of a missing quadrature-phase signal when the blank signal indicates the absence of a quadrature-phase signal.

2. A method in accordance with claim 1 wherein said in-phase signal is delayed by a fraction of an in-phase signal cycle when said blank signal is first generated.

3. A method in accordance with claim 1, further comprising detecting the occurrence of a hard acceleration of said optical pickup unit and delaying occurrence of said in-phase signal and causing said fake quadrature-phase signal to occur where said undelayed in-phase signal would have occurred.

4. A method in accordance with claim 1, further comprising detecting occurrence of a stall condition for said optical pickup unit and inhibiting generation of said blank signal during the occurrence of the stall condition.

5. Apparatus for regenerating quadrature-phase track crossing signals for searches across blank data areas on read/write compact discs, such apparatus comprising:

circuitry for receiving in-phase and quadrature-phase track crossing signals from an optical pickup unit and supplying the crossing signals to a track crossing counter mechanism;

circuitry for comparing the in-phase and quadrature-phase track crossing signals for generating a blank signal when no quadrature signal transition occurs between two successive in-phase signal transitions;

circuitry responsive to the in-phase signals for generating fake quadrature-phase signals; and circuitry responsive to the blank signal for supplying a fake quadrature-phase signal to the track crossing counter mechanism during the occurrence of the blank signal.

6. Apparatus in accordance with claim 5, further comprising circuitry for delaying said in-phase signal by a fraction of an in-phase signal cycle when said blank signal is first generated.

7. Apparatus in accordance with claim 5, further comprising circuitry responsive to said in-phase track crossing signals for detecting a hard acceleration of said optical pickup unit and delaying occurrence of said in-phase signal and causing said fake quadrature-phase signal to occur where an undelayed in-phase signal would have occurred.

8. Apparatus in accordance with claim 5, further comprising circuitry responsive to said in-phase track crossing signal for detecting the occurrence of a stall condition for said optical pickup unit and inhibiting the generation of a blank signal during the occurrence of the stall condition.

9. A method of comparing two sets of pulse signals having the same frequency and offset in time relative to one another and producing a missing transition signal when a signal transition in one set of the pulse signals is missing, the method comprising:

supplying the two sets of pulse signals to a bistable circuit for alternately setting and resetting the bistable circuit; and comparing the output of the bistable circuit with one of the sets of pulse signals for producing a missing transition signal when the bistable circuit fails to alternate between set and reset conditions.

10. Apparatus for comparing two sets of pulse signals having the same frequency and offset in time relative to one another and producing a missing transition signal when a signal transition in one set of the pulse signals is missing, the apparatus comprising:

a bistable circuit;

circuitry for supplying the two sets of pulse signals to the bistable circuit for alternately setting and resetting the bistable circuit; and circuitry for comparing the output of the bistable circuit with one of the sets of pulse signals for producing a missing transition signal when the bi-stable circuit fails to alternate between set and reset conditions.

11. Apparatus for comparing first and second sets of pulse signals having the same frequency and offset in time relative to one another and producing a missing transition signal when a signal transition in the second set of pulse signals is missing, the apparatus comprising:

a first bistable circuit having set and reset input terminals and an output terminal;

a second bistable circuit having a data input terminal an enable data read-in terminal and an output terminal for producing a missing transition signal;

circuitry for supplying the first set of pulse signals to the set input terminal of the first bistable circuit and to the enable data read-in terminal of the second bistable circuit;

circuitry for supplying the second set of pulse signals to the reset input terminal of the first bistable circuit; and circuitry for coupling the output of the first bistable circuit to the data input terminal of the second bistable circuit.

* * * * *